(12) United States Patent
Puputti et al.

(10) Patent No.: US 7,940,798 B2
(45) Date of Patent: May 10, 2011

(54) BURST TRANSMISSION (75) Inventors: Matti Puputti, Turku (FI); Tommi Auranen, Turku (FI); Kimmo Laiho, Turku (FI)

(73) Assignee: Nokia Corporation, Espoo (FI)

( * ) Notice: Subject to any disclaimer, the term of this patent is extended or adjusted under 35 U.S.C. 154(b) by 938 days.

(21) Appl. No.: 10/558,905

(22) PCT Filed: May 26, 2004

(86) PCT No.: PCT/IB2004/050782
§ 371 (c)(1),
(2), (4) Date: Nov. 30, 2005

(87) PCT Pub. No.: WO2004/107619
PCT Pub. Date: Dec. 9, 2004

(65) Prior Publication Data
US 2006/0245488 A1 Nov. 2, 2006

(30) Foreign Application Priority Data

May 30, 2003 (GB) .................................... 0312439.3

(51) Int. Cl.
*H04J 3/22* (2006.01)
(52) U.S. Cl. .................... 370/471; 370/473; 370/490
(58) Field of Classification Search .................. 370/389, 370/487, 395.64, 395.5, 535, 498, 493, 471, 370/473, 490
See application file for complete search history.

(56) References Cited

U.S. PATENT DOCUMENTS

| 7,130,313 | B2 * | 10/2006 | Pekonen ........................ 370/473 |
| 2002/0105976 | A1 | 8/2002 | Kelly et al. |
| 2003/0152107 | A1 | 8/2003 | Pekonen |
| 2005/0013274 | A1 * | 1/2005 | Pekonen et al. .............. 370/329 |
| 2005/0041696 | A1 * | 2/2005 | Pekonen ........................ 370/537 |
| 2006/0258324 | A1 * | 11/2006 | Vare et al. .................. 455/343.3 |
| 2007/0002900 | A1 * | 1/2007 | Karkas et al. ................. 370/473 |

FOREIGN PATENT DOCUMENTS

| WO | WO 02082834 | 10/2002 |
| WO | WO 03069833 | 8/2003 |
| WO | WO 2004066652 | 8/2004 |

* cited by examiner

*Primary Examiner* — Brenda Pham
(74) *Attorney, Agent, or Firm* — Ware, Fressola, Van Der Sluys & Adolphson LLP (57) ABSTRACT

A terrestrial digital video broadcasting (DVB-T) network is used to transmit IP datagrams to receiving devices using multiprotocol encapsulation (MPE). MPE datagram section and, if forward error correction (FEC) is used, MPE-FEC datagram sections may include time-slicing parameters, such as a "delta-t" parameter for specifying a time until the next burst is transmitted and a flag for indicating the end of a burst. Thus, MPE and MPE-FEC datagram sections can be transmitted in bursts. Other types of sections, however, do not include such time-slicing parameters and thus cannot usually be transmitted in bursts. Nevertheless, by assembling a burst including at least one MPE or MPE-FEC datagram section which specifies delta-t and MPE or MPE-FEC datagram section at the end of a burst which indicates its position, other types of sections can benefit from being transmitted in bursts.

37 Claims, 10 Drawing Sheets

BURST TRANSMISSION

CROSS REFERENCE TO RELATED APPLICATIONS

This application is for entry into the U.S. national phase under §371 for International Application No. PCT/IB04/050782 having an international filing date of May 26, 2004, and from which priority is claimed under all applicable sections of Title 35 of the United States Code including, but not limited to, Sections 120, 363 and 365(c), and which in turn claims priority to UK application 0312439.3 filed on May 30, 2003.

FIELD OF THE INVENTION

The present invention relates to a method of transmitting a burst in a communication system, particularly, but not exclusively, to a method of transmitting a burst in a digital video broadcasting (DVB) network

BACKGROUND ART

Mobile communications systems are known which can provide enough bandwidth to allow streaming of video using advanced compression techniques, such as MPEG-4. For example, a third generation mobile network has a maximum bandwidth of 384 kilobits per second (kps). However, this is not enough for some types of services, such as file downloading.

Nevertheless, higher bandwidth transmission systems are known. For example, a Digital Video Broadcasting (DVB) transmission system can provide bandwidth of 10 Mbps or more. Thus, it is possible to augment a mobile communications system with a higher bandwidth transmission system.

DVB receivers are known in applications such as digital television. Usually, DVB receivers are fixed and mains-powered. However, mobile handheld terminals are usually battery-powered and so power is limited.

The average power consumption of a DVB receiver can be reduced by using a scheme based on time division multiplexing (TDM). Such a scheme is called time slicing.

If a service is requested, data can be transmitted using time slicing. Bursts of data are sent using significantly higher bandwidth compared to the bandwidth needed to send the data using static bandwidth. Each burst includes an indication of time to the beginning of the next burst, which is referred to as "delta-t". Between bursts, data is not transmitted, allowing other services to use the bandwidth allocated to the service. Thus, the receiver need only stay active for a portion of time while receiving bursts. Nevertheless, received bursts can be buffered and consumed at a relatively more uniform and lower rate.

At present, time slicing cannot be used for some types of data. This is because data structures, such as Entitlement Management Message (EMM) sections which are used to transmit the EMM messages, cannot accommodate time slicing information, such as delta-t.

The present invention seeks to ameliorate this drawback.

SUMMARY OF THE INVENTION

According to the present invention there is provided a method of transmitting a burst in communications network, the method comprising providing a first data structure without any time-slicing parameters for describing bursts, providing a second data structure with a set of time-slicing parameters and forming a burst including the first and second data structures.

This can have the advantage of allowing the first data structure to be transmitted in burst.

Forming the burst may comprise arranging the second data structure at an end of the burst. The method may comprise providing, in the second data structure, data indicating end of the burst. Providing data indicating the end of the burst may comprise locating the data at a first predetermined position within the second data structure. The method may comprise providing, in the second data structure, data relating to a subsequent burst. The method may comprise providing, in the second data structure, data relating to an adjacent, subsequent burst. Providing data relating to the subsequent burst or the subsequent adjacent burst may comprise specifying a time until a beginning of a subsequent burst. Providing data relating to the subsequent burst or the subsequent adjacent burst may comprise specifying a beginning of a subsequent burst relative to a position of the second structure within the burst. Providing data relating to the subsequent burst or the subsequent adjacent burst may comprise locating the data at a second predetermined position within the second data structure. The method may comprise providing a third data structure with a set of time-slicing parameters and forming a burst including the first, second and third data structures. The method may include providing, in the third data structure, data relating to a subsequent burst. The method may include providing, in the third data structure, data relating to an adjacent, subsequent burst. Providing data relating to the subsequent burst or the subsequent adjacent burst may comprise specifying a time until a beginning of a subsequent burst. Providing data relating to the subsequent burst or the subsequent adjacent burst may comprise specifying a beginning of a subsequent burst relative to a position of the third structure within the burst. Providing the data relating to the subsequent burst or the subsequent adjacent burst may comprise locating the data at a third predetermined position within the third data structure, wherein the third predetermined position within the third data structure may correspond to the second predetermined position within the second data structure. The method may comprise providing, in the first data structure, a first identifier for identifying the first data structure as being of a first type and providing, in the second data structure, a second identifier for identifying the second data structure as being, of a second, different type. Providing the first and second identifiers may comprises providing the first identifier at a fourth predetermined position within the first data structure, providing the second identifier at a fifth predetermined position within the second data structure, wherein the fourth predetermined position within the first data structure corresponds to the fifth predetermined position within the second data structure. One of the first and second data structures may follow the other of the first and second data structures.

Providing the second data structure may comprise providing a multiprotocol encapsulation (MPE) section and/or a multiprotocol encapsulation-forward error correction (MPE-FEC) section. Providing the second data structure may comprise formatting data using Digital Storage Media Command and Control (DSM-CC) section format. The method may comprise locating the set of time slicing parameters within at least part of a data region formed by at least one media access control (MAC) address field. The method may comprise locating the set of time slicing parameters within at least part of a data region formed by four media access control (MAC) address fields. Providing the first data structure may comprise providing an MPEG-2 private section. The first and second data structures may be hierarchically substantially equal.

According to the present invention there is also provided a method of operating a network element in a communications network, the method comprising forming a burst including a first data structure with a set of time-slicing parameters for describing bursts and a second data structure without any time-slicing parameters.

According to the present invention there is also provided a method of operating a receiving device in a communications network, the method comprising receiving a burst including a first data structure with a set of time-slicing parameters for describing bursts and a second data structure without any time-slicing parameters, identifying the first data structure and extracting at least one time slicing parameter from the first data structure.

Identifying the first data structure may comprise inspecting a first predetermined field in each of the first and second data structures. Extracting the at least one time slicing parameter from the first data structure may comprise inspecting a second predetermined field in the first structure and reading from the second predetermined field, data relating to a subsequent burst. The method may further comprise storing the data relating to a subsequent burst. The method may further comprise inspecting a third predetermined field in the first structure and reading from the third predetermined field, data indicating end of the burst.

According to the present invention there is also provided a computer program comprising computer program instructions for causing data processing apparatus to perform the method.

According to the present invention there is also provided a network element configured to form a burst including a first data structure with a set of time-slicing parameters for describing bursts of data and a second data structure without any time-slicing parameters.

The first data structure may comprise a multiprotocol encapsulation (MPE) section or a multiprotocol encapsulation-forward error correction (MPE-FEC) section. The second data structure may comprise an MPEG-2 private section. The network element may be a transmitter.

According to the present invention there is also provided a handset comprising a receiver and a processor, the handset configured to receive a burst including a first data structure with a set of time-slicing parameters for describing bursts and a second data structure without any time-slicing parameters, to identify the first data structure and to extract at least one time slicing parameter from the first data structure.

According to the present invention there is also provided a system for transmitting a burst in communications network, the system comprising providing a first data structure without any time-slicing parameters for describing bursts, providing a second data structure with a set of time-slicing parameters and forming a burst including the first and second data structures.

BRIEF DESCRIPTION OF THE DRAWINGS

An embodiment of the present invention will now be described with reference to the accompanying drawings in which.

DETAILED DESCRIPTION OF THE INVENTION

Communication System 1

Figure 1:
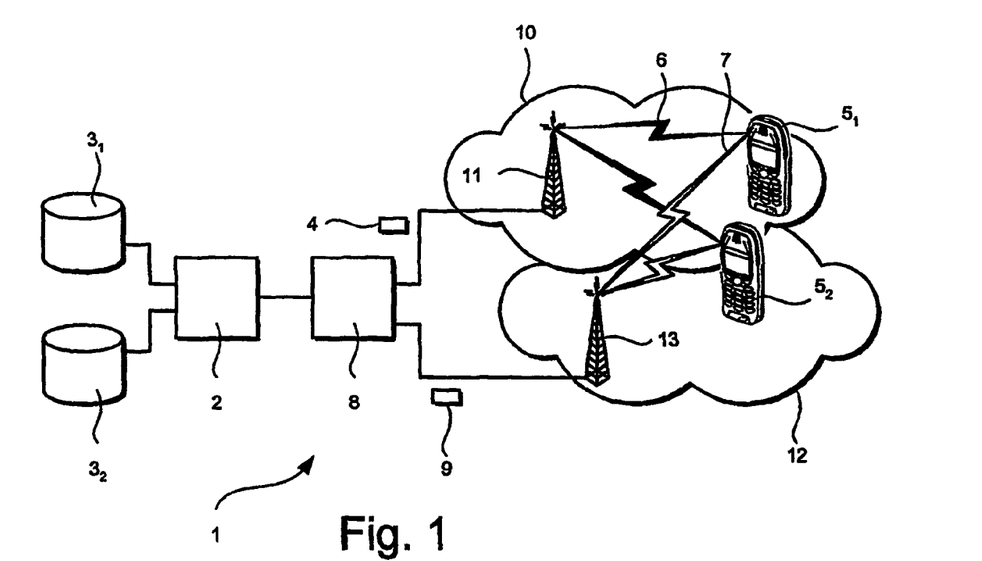
FIG. 1 shows a communication system.

Referring to FIG. 1, a communication system 1 is shown. The communications system 1 includes a content provider 2 which has access to sources $3_1$, $3_2$ of content, such as audio-visual content, data files or images.

Content 4 may be transmitted using internet protocol (IP) over a digital broadband network, such as a terrestrial Digital Video Broadcasting (DVB-T) network, as an IP datacasting (IPDC) service, to one or more receiving devices $5_1$, $5_2$. The receiving devices $5_1$, $5_3$, in the form of mobile telephones with video capabilities, are configured to receive data from at least two different communication channels 6, 7.

Content data 4 is transmitted to a network element 8 which is a server configured to receive the content data 4 and to generate recovery data 9 for use in error correction of the content data 4. The content data 4 is transmitted to the receiving devices $5_1$, $5_2$ via a first communications channel 6. In this example, the first communications channel 6 is provided by a first communications network 10 in the form of broadcasting network, such as a DVB-T network, which includes a transmitter 11. Content data 4 is broadcast, multicast or unicast to receiving devices $5_1$, $5_2$ within a cell (not shown) associated with the first communication network 10.

Recovery data 9 may be transmitted to the receiving devices $5_1$, $5_2$ via a second communication channel 7. In this example, the second communications channel 7 is provided by a second, different communications network 12 in the form of a mobile network, such as a third generation (3G) mobile network, which include a transmitter 13. Recovery data 9 and other data, such a voice data, are transmitted to receiving devices $5_1$, $5_2$ within a cell (not shown) associated with the second communication network 12. The second communications network 12 may be a second generation (2G) or a two-and-half generation (2.5G) network.

In FIG. 1, the communication system 1 is shown in a simplified form. Other elements, such as further transmitters (not shown), network elements (not shown) or networks (not shown) may be included.

The transmitters 11, 13 each provide a transmitter node for transmitting data to the receiving devices $5_1$ $5_2$, which constitute receiver or recipient nodes.

Network Element 8

Figure 2:
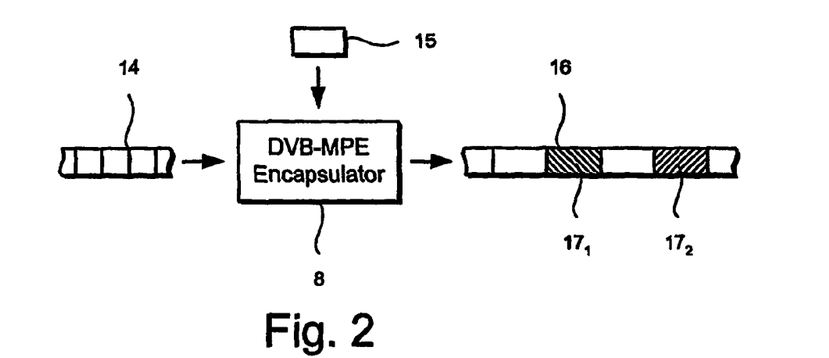
FIG. 2 shows a multiprotocol encapsulation (MPE) encapsulator which outputs transport stream packets.

Referring to FIG. 2, the network element 8 is a DVB multiprotocol encapsulation (MPE) encapsulator. The network element 8 receives IP datagrams 14 and service data 15, such as MPEG program specific information (PSI) and DVB service information (SI), and generates a transport stream 16 according to ISO/IEC 13818-1. The transport steam 16 comprises transport stream (TS) packets 17, typically 188 bytes long.

Figure 3:
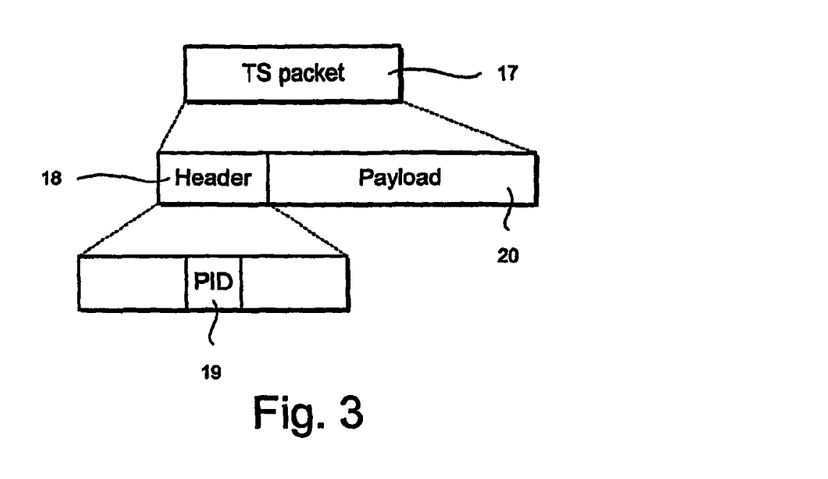
FIG. 3 illustrates a transport stream packet.

Referring also to FIG. 3, the transport stream 16 is divided into a number of logical channels. The logical channel to which a TS packet 17 belongs is defined in a packet header 18 using a packet identifier (PID) 19. The packet identifier can be used to identify contents of a TS packet payload 20.

For example, the contents of a first TS packet $17_1$ may be identified as being video, audio or another type of data by specifying a PID value between 0x0030 to 0x1FFE (as hexadecimal number). The contents of a second TS packet $17_2$ may be identified as containing all or part of network information table (NIT) by specifying PID=0x00010. As will be explained in more detail later, an NIT and other types of table may be used to signal time slicing parameters and other parameters relating to forward error correction to a receiving device $5_1$, $5_2$ FIG. 1).

The MPE encapsulator 8 also performs other functions and these will be described in more detail later.

Receiving Device $5_1$, $5_2$

Figure 4:
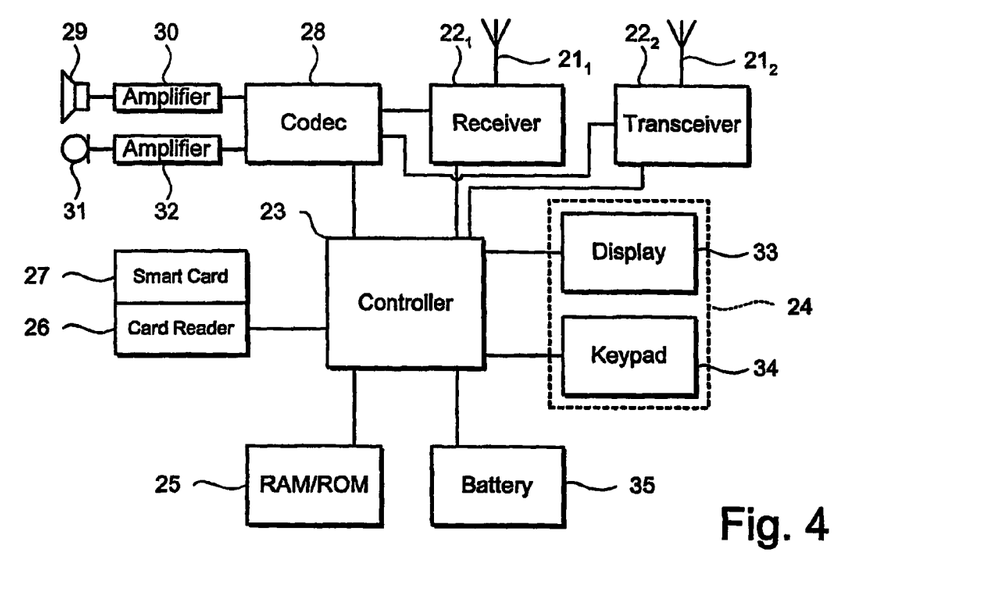
FIG. 4 is a schematic diagram of a mobile telephone handset.

Referring to FIG. 4, each receiving device $5_1$, $5_2$ is preferably in the form of a mobile telephone handset with a multimedia capability.

Each receiving device $5_1$, $5_2$ includes first and second antennae $21_1$, $21_2$, a receiver $22_1$ and a transceiver $22_2$. In this example, the first antenna $21_1$ and receiver $22_1$ are used to receive signals from the first communications network 10, in this case a DVB-T network. The second antenna $21_2$ and transceiver $22_2$ are used to transmit and receive signals to and from the second communications network 10. The receiver and transceiver $22_1$, $22_2$ each include respective r.f. signal processing circuits (not shown) for amplifying and demodulating received signals and respective processors (not shown) for channel decoding and demultiplexing.

Each receiving device $5_1$, $5_2$ also includes a controller 23, a user interface 24, memory 25, a smart card reader 26, smart card 27 received in the smart card reader 26, a coder/decoder (codec) 28, a speaker 29 with corresponding amplifier 30 and a microphone 31 with a corresponding pre-amplifier 32.

The user interface 24 comprises a display 33 and a keypad 34. The display 33 is adapted for displaying images and video by, for instance, being larger and/or having greater resolution than a display of conventional mobile telephone and being capable of colour images. Each receiving device $5_1$, $5_2$ also includes a battery 35.

The controller 23 manages operation of a receiving device $5_1$, $5_2$ under the direction of computer software (not shown) stored in memory 25. For example, the controller 23 provides an output for the display 33 and receives inputs from the keypad 34.

Figure 5:
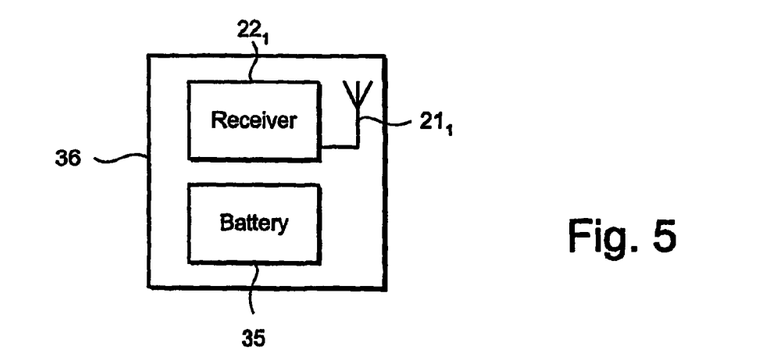
FIG. 5 is schematic diagram of a battery pack for a mobile telephone handset.

Referring to FIG. 5, the battery 35 and the first antenna $21_1$ and the receiver $22_2$ may be incorporated into a battery pack 36. By replacing a battery pack (not shown) of a conventional mobile telephone handset with battery pack 36 including receiver $22_1$ and by also providing suitable software, a conventional mobile telephone handset (not shown) may be modified to receive data via the first communications network 10. Alternatively, the first antenna $21_1$ and the receiver $22_1$ may be incorporated into a cover (not shown) for a conventional mobile telephone handset (not shown).

The receiving device $5_1$, $5_2$ may be modified providing a single receiver adapted to receive signals from the first and second communications networks 10, 12 (FIG. 1) and a transmitter adapted to transmit signals to the second communications network 12 (FIG. 1). Alternatively, a single transceiver for both communications networks 10, 12 may be provided.

Figure 6:
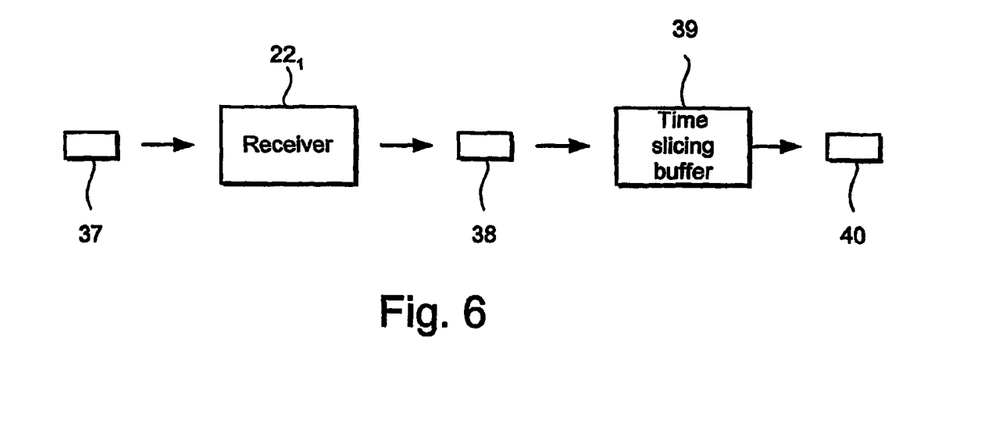
FIG. 6 shows a receiver and a time slicing buffer included in the mobile telephone handset shown in FIG. 4.

Referring to FIG. 6, the receiver 22, receives a signal 37 from the first communications network 10. The signal 37 is amplified, demodulated, channel decoded and demultiplexed. The resulting demultiplexed signal (not shown) is filtered so as to extract bursts 38 of datagrams. The datagram bursts 38 are fed into a time slice buffer 39 which is provided by controller 23 and memory 25 so as to produce a stream 40 of datagrams which is not time sliced. Preferably, the datagram stream 40 is substantially continuous and/or at a substantially constant rate.

A receiving device $5_1$ $5_2$ may be a personal data assistant (PDA) or other mobile terminal capable of at least of receiving signals via the first communications networks 10. The receiving device $5_1$ $5_2$ may also be semi-fixed or semi-portable such as a terminal carried in vehicle, such as a car.

Operation of the MPE Encapsulator 8

The MPE encapsulator 8 performs a number of functions, some of which fall into two categories: processes which involve preparing and transmitting application data in bursts and processes which involve preparing and signalling time slicing and forward error correction parameters.

Figure 7:
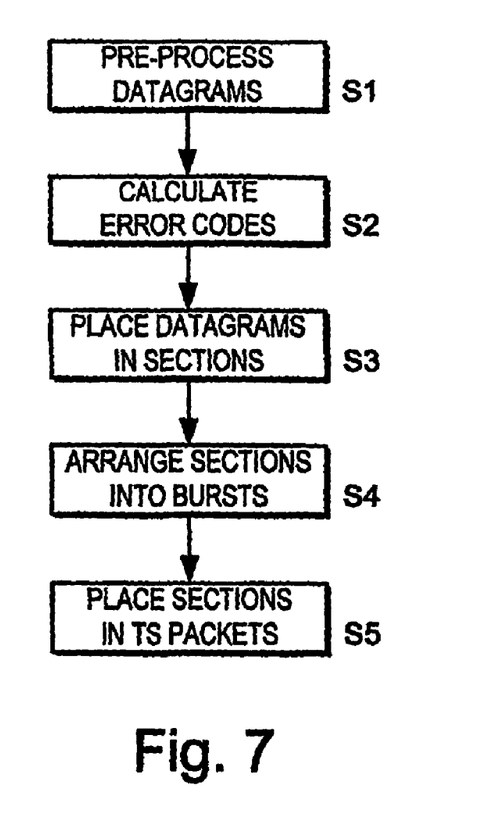
FIG. 7 is a process flow diagram of a first process performed by the MPE encapsulator shown in FIG. 2.
Figure 8:
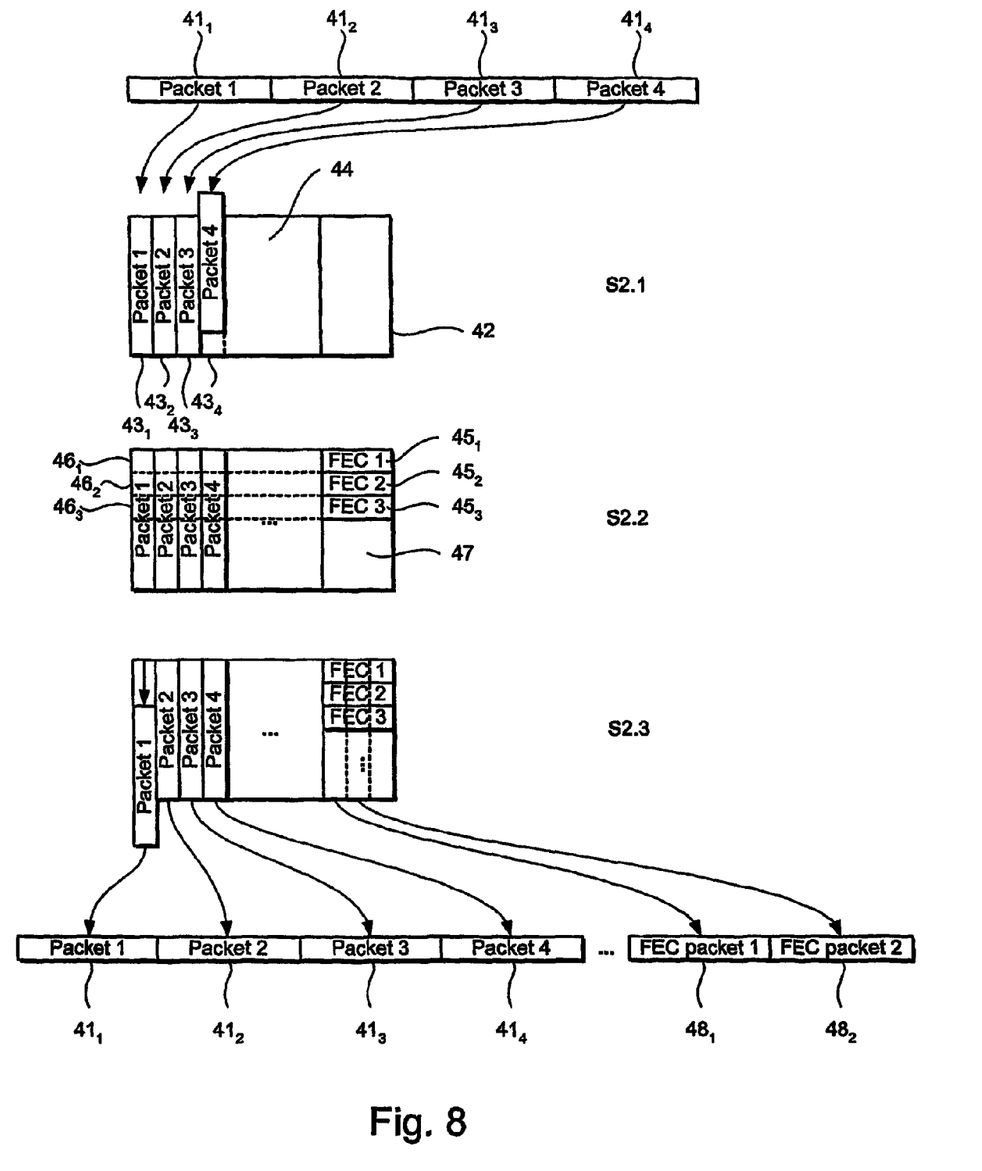
FIG. 8 shows a process by which forward error correction data is calculated.

Preparing and Transmitting Application Data in Bursts Using MPE and MPE-FEC Datagrams Referring to FIGS. 7 and 8, a process by which the MPE encapsulator 8 (FIG. 1) generates forward error codes and formats data, in this case using a Digital Storage Media Command and Control (DSM-CC) section format, is described.

The MPE encapsulator 8 (FIG. 1) receives a stream of data packets $41_1$, $41_2$, $41_3$, $41_4$, in this case IP datagrams, from content provider 2 (FIG. 1) and, if necessary, pre-processes them by arranging them in order and/or dropping selected datagrams, for example based on IP address (step S1). It will be appreciated that the MPE encapsulator 8 (FIG. 1) may receive Ethernet frames (not shown) and thus, additional processing, such as removing Ethernet frame structure, may be required.

Optionally, forward error correction codes are calculated for the data packets $41_1$, $41_2$, $41_3$, $41_4$ (step S2).

The packets $41_1$, $41_2$, $41_3$, $41_4$ are stored in a coding table or array 42 (step S2.1). The packets $41_1$, $41_2$, $41_3$, $41_4$ are stored sequentially in columns $43_1$, $43_2$, $43_3$, $43_4$ in a portion of the table 42 referred to as the application data table 44 which in this case occupies the left-most portion of the table 42. The contents of a packet $41_1$, $41_2$, $41_3$, $41_4$ can occupy one or more addressable storage locations of one or more columns $43_1$, $43_2$, $43_3$, $43_4$.

Once a given number of packets have been stored or the application data table 44 has been filled, forward error correction (FEC) data $45_1$, $45_2$, $45_3$ is calculated (step S2.2). The FEC data $45_1$, $45_2$, $45_3$, preferably in the form of Reed- Solomon data, is calculated for each row $46_1$, $46_2$, $46_3$ and entered into a portion of the table 42 referred to as the Reed-Solomon data table 47.

Preferably, the coding table 42 has 255 columns. For example, the application data table 44 may comprise 191 columns and the Reed-Solomon table 47 may comprise 64 columns. Preferably, the application data table occupies the left-most portion of table 42 and Reed-Solomon table occupies the right-most portion of the table 42. The coding table 42 may comprises a selectable number of rows, up to 1024 rows. Preferably, the table 42 comprises one-byte addressable elements. Thus, a table with 255 columns and 1024 rows may store up to 2 Mbits of data.

It will be appreciated that packets $41_1$, $41_2$, $41_3$, $41_4$ may be stored sequentially in rows and FEC data $45_1$, $45_2$, $45_3$ calculated for each column. In other words, rows and columns are interchangeable. It will also be appreciated that the length or size of packets $41_1$, $41_2$, $41_3$, $41_4$ can vary. The packets $41_1$, $41_2$, $41_3$, $41_4$ may be an uneven size. The application data table 44 may be filled with stuffing information, for example at the end of table. The stuffing information may be omitted when calculating FEC data $45_1$, $45_2$, $45_3$.

The packets $41_1$, $41_2$, $41_3$, $41_4$ and FEC packets $48_1$, $48_2$ are read out of the coding table (step S2.3). The FEC packets $48_1$, $48_2$ are read out column by column. The packets $41_1$, $41_2$, $41_3$, $41_4$ and FEC packets $48_1$, $48_2$ are separated and formatted (step S3).

The MPE encapsulator 8 (FIG. 1) preferably formats data in accordance with Section 7 of European Telecommunications Standards Institute (ETSI) Standard 301 192 "Digital Video Broadcasting (DVB); DVB specification for data broadcasting" V1.3.1 (2003-01). Reference is also made Section 4 of ETSII TR 301 192 "Digital Video Broadcasting (DVB); implementation guidelines for Data Broadcasting" V1.2.1 (2003-01).

Figures 9, 10, 11:
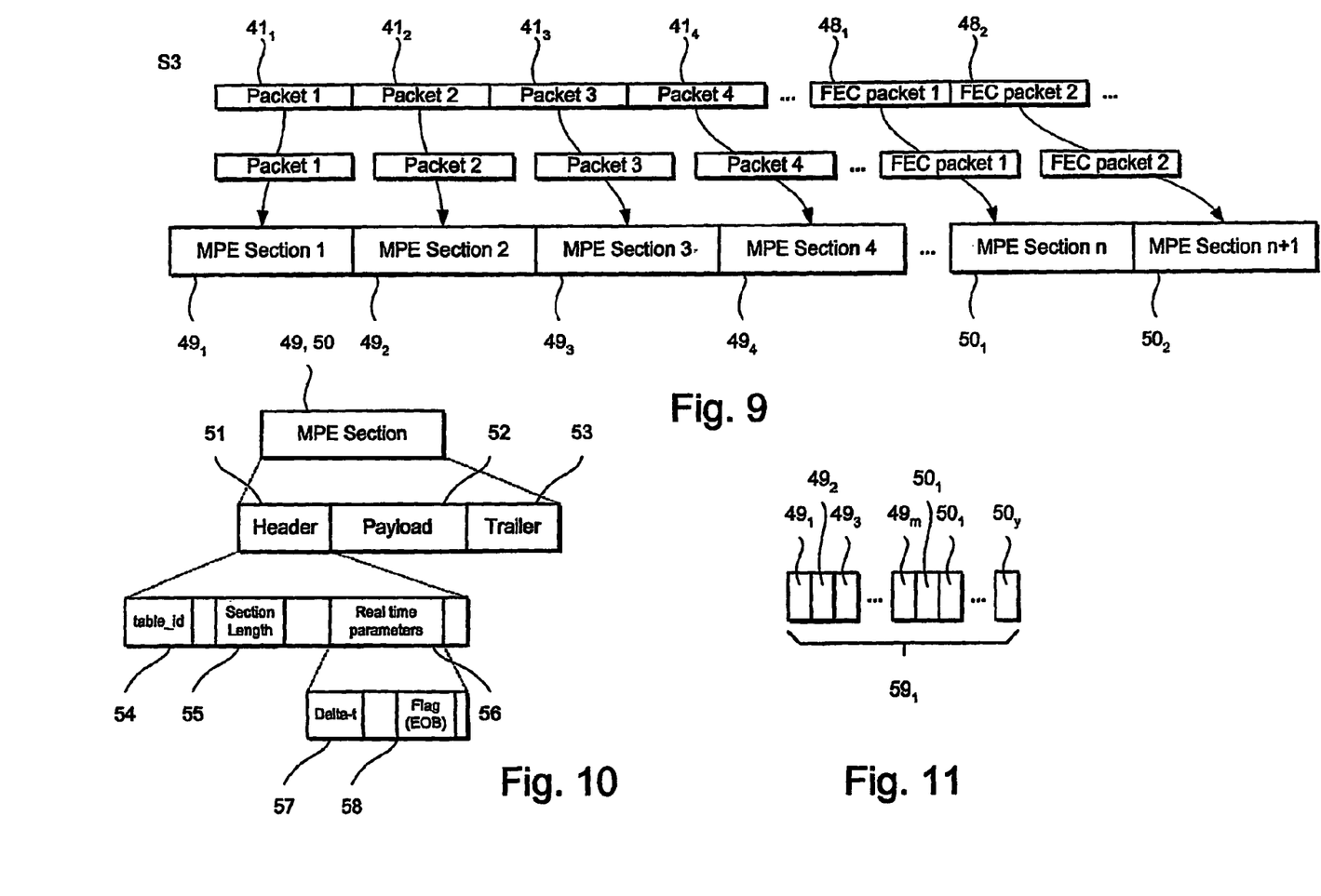
FIG. 9 shows datagrams being placed in MPE datagram sections.
FIG. 10 illustrates an MPE datagram section.
FIG. 11 illustrates a burst comprising MPE sections.

Referring to FIG. 9, the MPE encapsulator 8 places packets $41_1$, $41_2$, $41_3$, $41_4$ into MPE datagram sections $49_1$, $49_2$, $49_3$, $49_4$ compliant with the DSM-CC section format, using the syntax defined in Table 1 below:

TABLE 1

| Syntax | No. of bits | Identifier |
|---|---|---|
| datagram_section( ) { | | |
| table_id | 8 | uimsbf |
| section_syntax_indicator | 1 | bslbf |
| private_indicator | 1 | bslbf |
| reserved | 2 | bslbf |
| section_length | 12 | uimsbf |
| MAC_address_6 | 8 | uimsbf |
| MAC_address_5 | 8 | uimsbf |
| reserved | 2 | bslbf |
| payload_scrambling_control | 2 | bslbf |
| address_scrambling_control | 2 | bslbf |
| LLC_SNAP_flag | 1 | bslbf |
| current_next_indicator | 1 | bslbf |
| section_number | 8 | uimsbf |
| last_section_number | 8 | uimsbf |
| MAC_address_4 | 8 | uimsbf |
| MAC_address_3 | 8 | uimsbf |
| MAC_address_2 | 8 | uimsbf |
| MAC_address_1 | 8 | uimsbf |
| if (LLC_SNAP_flag == "1") { | | |
|     LLC_SNAP( ) | | |
| } else { | | |
|     for (j=0;j<N1;j++) { | | |
|         IP_datagram_data_byte | 8 | bslbf |
|     } | | |
| } | | |
| if (section_number == last_section_number) { | | |

TABLE 1-continued

| Syntax | No. of bits | Identifier |
|---|---|---|
|     for(j=0;j<N2;j++) { | | |
|         stuffing_byte | 8 | bslbf |
|     } | | |
| } | | |
| if (section_syntax_indicator =="0") { | | |
|     checksum | 32 | uimsbf |
| } else { | | |
|     CRC_32 | 32 | rpchof |
| } | | |
| } | | |

Referring still to FIG. 8, the MPE encapsulator 8 places FEC packets $48_1$, $48_2$ into so-called MPE-FEC datagram sections $50_1$, $50_2$ using the syntax defined in Table 2 below:

TABLE 2

| Syntax | No. of bits | Identifier |
|---|---|---|
| FEC_section ( ) { | | |
|     table_id | 8 | uimsbf |
|     section_syntax_indicator | 1 | bslbf |
|     reserved_for_future_use | 1 | bslbf |
|     reserved | 2 | bslbf |
|     section_length | 12 | uimsbf |
|     padding_columns | 8 | uimsbf |
|     reserved_for_future_use | 8 | bslbf |
|     reserved | 2 | bslbf |
|     reserved_for_future_use | 5 | bslbf |
|     current_nect_indicator | 1 | bslbf |
|     section_number | 8 | uimsbf |
|     last_section_number | 8 | uimsbf |
|     real_time_parameters( ) | | |
|     for( i=0; i<N; i++ ) { | | |
|         rs_data_byte | 8 | uimsbf |
|     } | | |
|     CRC_32 | 32 | uimsbf |
| } | | |

Referring to FIG. 10, the general structure of an MPE section 49 or MPE-FEC section 50 is shown. An MPE/MPE-FEC section 49, 50 comprises a header 51, a payload 52 and a trailer 53. The payload 52 includes a packet $41_1$, $41_2$, $41_3$, $41_4$ (FIG. 9) or a FEC packet $48_1$, $48_2$ (FIG. 9) as defined in Table 1 or 2 above.

The header 51 includes a table_id field 52, a section length field 53 and real time or time slicing parameters 54 field, provided by redundant MAC_address 1 to MAC-_address 4 fields. The real time or time slicing parameters 54 field includes a delta-t field 55 and a flag 56 for indicating a frame boundary.

Referring to FIG. 11, the MPE sections $49_1$, $49_2$, $49_3$, $49_4$ and MPE-FEC sections $50_1$, $50_2$ comprise a burst $59_1$. As will be explained in more detail later, the burst $59_1$ is delivered on an elementary stream, which is identified by a single PID. Between the burst $59_1$ and a next burst $59_2$ (FIG. 13), no sections are transmitted in respect of the same elementary stream.

Figure 12:
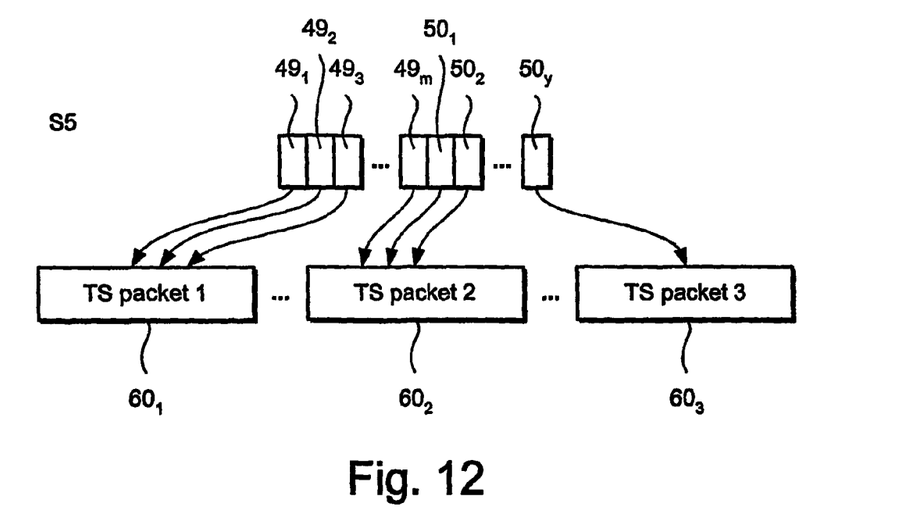
FIG. 12 illustrates encapsulation of MPE datagram sections in transport stream packets.

Referring to FIG. 12, the first burst $59_1$ comprising the MPE sections $49_1$, $49_2$, $49_3$, $49_4$ and MPE-FEC sections $50_1$, $50_2$ are placed in TS packets $60_1$, $60_2$, $60_3$ (step S5) according to ISO/IEC 13818-1.

In this example, a TS packet $60_1$, $60_2$, $60_3$ may include plural MPE sections $49_1$, $49_2$, $49_3$, $49_4$ and MPE-FEC sections $50_1$, $50_2$. However, a MPE section $49_1$, $49_2$, $49_3$, $49_4$ or MPE-FEC section $50_1$, $50_2$ may be divided between a plurality of TS packets $60_1$, $60_2$, $60_3$. The TS packets $60_1$, $60_2$, $60_3$ are labelled with the same PID.

Figure 13:
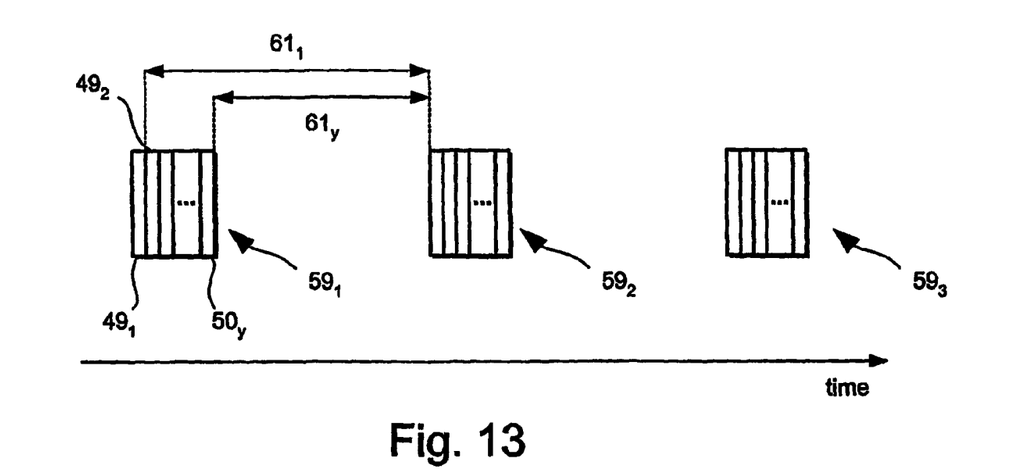
FIG. 13 illustrates a plurality of bursts comprising MPE sections.

Referring also to FIG. 13, the burst $59_1$ can indicate the start time of the next burst $59_2$ within the elementary stream. This is achieved by signalling to the receiving devices $5_1$, $5_2$ that time slices and/or FEC is being used and transmitting information relating to the following burst in the elementary stream.

Referring again to FIG. 10 and Tables 1 and 2 above, signalling involves including a data broadcast descriptor in a Service Description Table (SDT) transmitted using service description sections, which indicates that MAC_address 1 to MAC_address 4 fields are not being used to differentiate receivers within the elementary stream but are being used to carry real time parameters 56, such as delta-t 57. The service description sections and data broadcast descriptor is described in more detail in Sections 6 and 7 of ETSI EN 301 468 "Digital Video Broadcasting (DVB); Specification for Service Information (SI) in DVB systems" V1.5.1 (2003-01).

Transmitting information relating to the following burst comprises including so-called real time parameters 56 in MAC_address_1 to MAC address_4 fields of each header as defined in Table 1 or 2 above of each MPE section $49_1$, $49_2$, $49_3$, $49_4$ and each MPE-FEC sections $50_1$, $50_2$. For example, Table 3 below shows real time parameter syntax:

TABLE 3

| Syntax | No. of bits | Identifier |
|---|---|---|
| realtime paramters( ) { | | |
| delta_t | 12 | uimsbf |
| table_boundary | 1 | bslbf |
| frame_boundary | 1 | bslbf |
| address | 18 | uimsbf |
| } | | |

Use of the delta_t field 57 depends on whether time slicing is used on the elementary stream concerned.

If time slicing is used, the delta_t field 57 indicates the time $61_1$, $61_y$ to the next time slice burst $59_2$ within the elementary stream. Delta-t is included in all MPE/MPE-FEC sections $49_1$, $49_2$, $49_3$, $49_4$, $50_1$, $50_2$ within a burst $54_1$ and the value $61_1$, $61_y$ may differ from section to section, for example from the first MPE section $49_2$ to the last MPE-FEC section $50_1$. Resolution of the delta-t is 10 ms. For example, a value 0xC00 (in hexadecimal)=3072 (in decimal) indicates the time to the next burst is 30.72 s. The value 0x00 is reserved to indicate that no more bursts will be transmitted within the elementary stream, in other word to indicate end of service. In such a case, all MPE/MPE-FEC sections $49_1$, $49_2$, $49_3$, $49_4$, $50_1$, $50_2$ within the burst $59_1$ have the same value in this field. Delta-t is defined from the transport_packet carrying the first byte of the current MPE section $49_1$, $49_2$, $49_3$, $49_4$ to the transport_packet carrying the first byte of next burst. Therefore the delta-t may differ between MPE/MPE-FEC sections $49_1$, $49_2$, $49_3$, $49_4$, $50_1$, $50_2$ sections within a burst $59_1$.

The time indicated by delta-t is beyond the end of the maximum burst duration of the actual burst. This helps to ensure that a decoder can reliably distinguish two sequential bursts within an elementary stream.

The burst $59_1$ contains complete MPE/MPE-FEC sections $49_1$, $49_2$, $49_3$, $49_4$, $50_1$, $50_2$. In other words, MPE/MPE-FEC sections $49_1$, $49_2$, $49_3$, $49_4$, $50_1$, $50_2$ are not divided between bursts $54_1$. The burst $54_1$ contains complete datagrams $41_1$, $41_2$, $41_3$, $41_4$, $48_1$, $48_2$. In other words, datagrams $41_1$, $41_2$, $41_3$, $41_4$, $48_1$, $48_2$ are not fragmented between bursts. Transmission of empty MPE sections, that it an MPE section with no payload, is preferably to be avoided.

Preferably, each burst $59_1$ contains at least one MPE section $41_1$, $41_2$, $41_3$, $41_4$, $48_1$, $48_2$ carrying a proper datagram $41_1$, $41_2$, $41_3$, $41_4$, $48_1$, $48_2$ containing network layer address (not shown). The address (not shown) is one of the addresses an IP/MAC Notification Table (INT) has associated with the elementary stream.

If time slicing is not used and MPE-FEC is used, the delta_t field supports a cyclic MPE-FEC frame index within the elementary stream. The value of the delta_t field increases by one for each subsequent MPE-FEC frame 42. After value "111111111111", the field restarts from "000000000000". If large portions of data is lost, this parameter makes it possible to identify to which MPE-FEC frame the any received section belongs.

The table_boundary field is a flag. When the flag is set to "1", it indicates that the current section is the last section of a table within the current MPE-FEC frame. If the section in question is an MPE section $49_1$, $49_2$, $49_3$, $49_4$, the flag indicates that the section $49_1$, $49_2$, $49_3$, $49_4$ is the last section of the application data table 44 (FIG. 8). A decoder not supporting MPE-FEC may ignore all subsequent sections until the end of the MPE-FEC frame 42, which is indicated using frame_boundary field. For each MPE-FEC frame 42, one MPE section $49_1$, $49_2$, $49_3$, $49_4$ is transmitted with this flag set. For each MPE-FEC frame 42 in which RS data 47 is transmitted, one FEC section $48_1$ is transmitted with this flag set. If MPE-FEC is not supported on the elementary stream, the flag is reserved for future use. When not used, the flag is set to "0".

The frame_boundary field 58 is a flag. When the flag 58 is set to "1", it indicates that the current section $50_y$ is the last section within the current burst $54_1$, if time slicing is supported, and within the MPE-FEC frame 42, if MPE-FEC is supported.

For each time slice burst $59_1$, one MPE section $49_1$, $49_2$, $49_3$, $49_4$ is transmitted with this flag set 58. For each MPE-FEC frame 42, one MPE/MPE-FEC section $49_1$, $49_2$, $49_3$, $49_4$, $50_1$, $50_2$ is transmitted with this flag set 58.

The address field specifies a byte position in the corresponding MPE-FEC frame table 42 for the first byte of the payload carried within the section. All sections delivering data for any MPE-FEC frame table 42 are delivered in ascending order according to the value of this field. The bytes position is a zero-based linear address within an MPE-FEC frame table 42, starting from the first row of the first column, and increasing towards the end of the column. At the end of the column, the next byte position is at the first row of the next column.

The first section carrying data of a given MPE-FEC frame is an MPE section carrying the application data datagram at address "0". All sections carrying application data datagrams of a given MPE-FEC frame 42 are transmitted prior to the first section carrying RS-data of the MPE-FEC frame 42. In other words, sections $49_1$, $49_2$, $49_3$, $49_4$ carrying application data datagrams are not interleaved with sections $50_1$, $50_2$ carrying RS-data within a single MPE-FEC frame 42. All sections carried between the first and the last section of an MPE-FEC frame 42 carry data belonging to the MPE-FEC frame 42, i.e. only application data 44 and RS data 47 is used. Sections delivering data of different MPE-FEC frames are not interleaved.

The section following the last section carrying application data datagram on an MPE-FEC frame 42 contain either the first section carrying the RS-data of the same MPE-FEC frame or the first application data section of the next MPE-FEC frame. In the later case, RS-data of the first MPE-FEC frame is not transmitted. For each MPE-FEC frame 42, one MPE section is transmitted with the address field set to "0". For each MPE-FEC frame 42 in which any RS data is transmitted, one FEC section is transmitted with the address field set to "0". Padding is not used within delivered application data in the application data table 44. Datagrams do not overlap in an application data table. Padding is not used within delivered RS data in the RS table 42.

Addressing starts from zero within each MPE-FEC frame table. If both time slicing and MPE-FEC are used on an elementary stream, each burst on the elementary stream shall contain exactly one MPE-FEC frame 42. In other words, the MPE-FEC frame 42 is not split over multiple bursts.

If MPE-FEC is not supported on the elementary stream, the address field is reserved for future use. When not used, the address field is set to 0x00.

It will be appreciated that many modifications may be made to the embodiments described above. For example, fixed receiving devices may be used.

Preparing and Transmitting MPEG-2 Private Sections

Figures 14, 16:
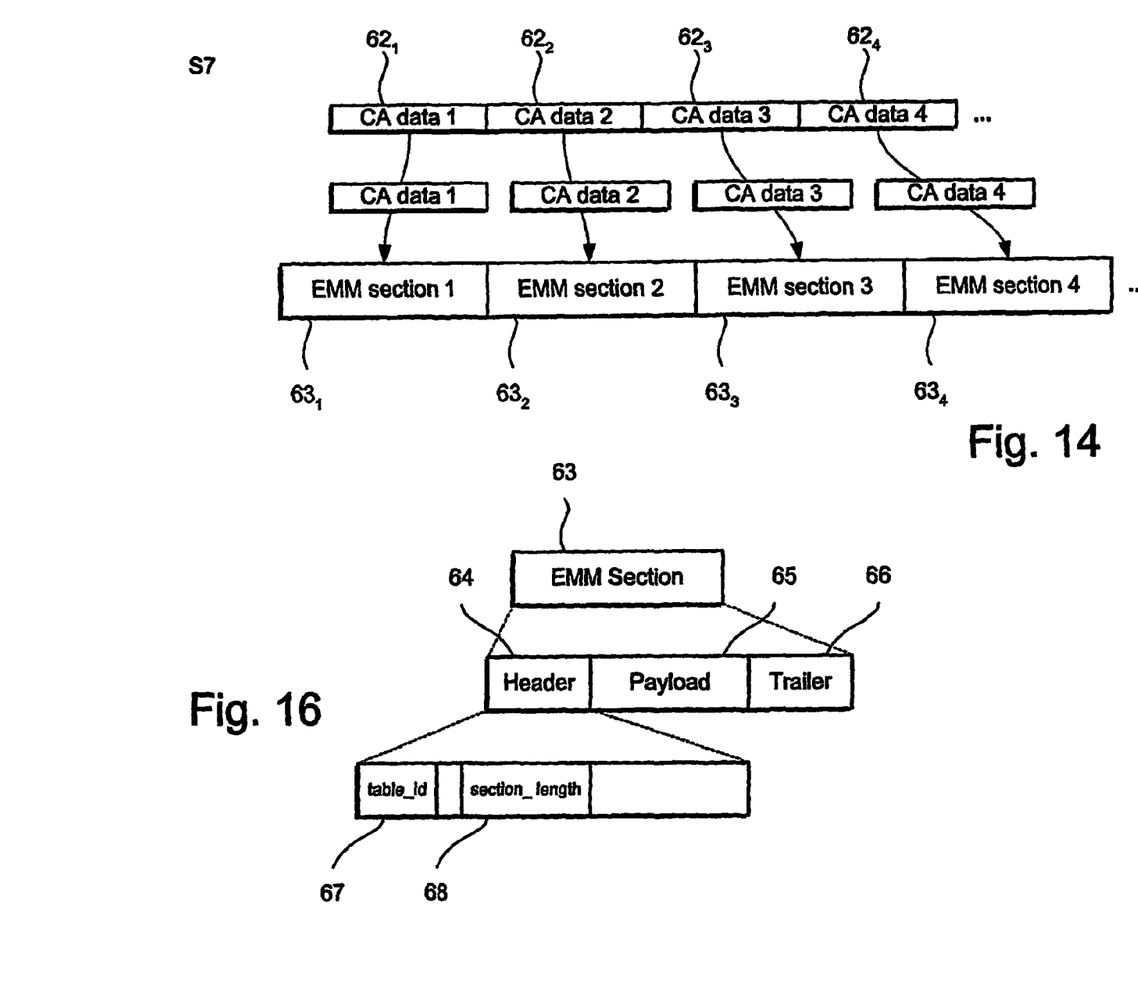
FIG. 14 shows data being placed in sections which are not MPE sections.
FIG. 16 illustrates a non-MPE datagram section.
Figure 15:
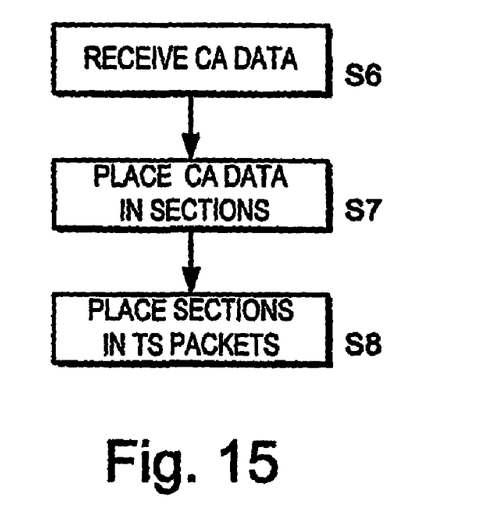
FIG. 15 is a process flow diagram of a second process performed by the MPE encapsulator shown in FIG. 2.

Referring to FIGS. 14 and 15, a process by which the MPE encapsulator 8 (FIG. 1) or other network element (not shown) can generate so-called "private sections" which are defined by ISO/IEC 13818-1 and which are not MPE and MPE-FEC datagram sections is shown. Private sections defined by ISO/IEC 13818-1 can be simply referred to as MPEG-2 private sections.

In this example, preparation and transmission of entitlement management message (EMM) sections is described.

The MPE encapsulator 8 receives EMM messages comprising condition access (CA) data $62_1$, $62_2$, $62_3$, $62_4$ (step S6) and places them in CA message sections $63_1$, $63_2$, $63_3$, $63_4$ (step S7), for example defined according to European Telecommunications Standards Institute (ETSI) Technical Report (ETR) 289, following the MPEG-2 private section structure, using the syntax shown in Table 4 below:

TABLE 4

| Syntax | No. of bits | Identifier |
|---|---|---|
| CA_message_section ( ) { | | |
|     table_id | 8 | uimsbf |
|     section_syntax_indicator | 1 | bslbf |
|     DVB_reserved | 1 | bslbf |
|     ISO_reserved | 2 | bslbf |
|     CA_section_length | 12 | uimsbf |
|     for( i=0; i<N; i++ ) { | | |
|         CA_data_byte | 8 | bslbf |
|     } | | |
| } | | |

CA message sections $63_1$, $63_2$, $63_3$, $63_4$ are hereinafter referred to as EMM sections. referring to FIG. 16, an MPEG-2 private section, in this case an EMM section 63, is shown. The section 63 includes a header 64, payload 65 and optional trailer 66.

The header 64 includes a table_id field 67 and a section length field 68. For example, for an EMM section 63, table_id=0x81 (hexadecimal).

Figure 17:
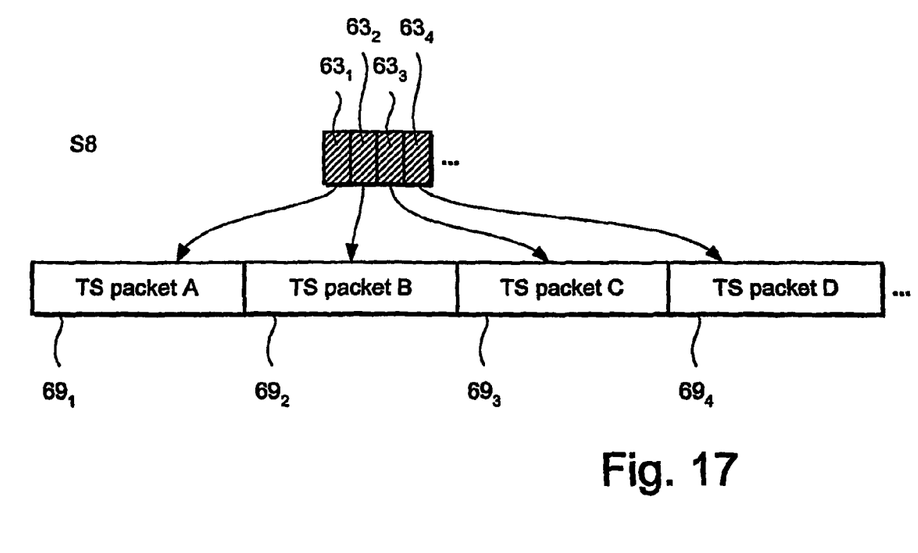
FIG. 17 illustrates encapsulation of non-MPE datagram sections in transport stream packets.

Referring to FIG. 17, EMM sections $63_1$, $63_2$, $63_3$, $63_4$ are placed in TS packets $70_1$, $70_2$, $70_3$, $70_4$ (step S8).

Figure 18:
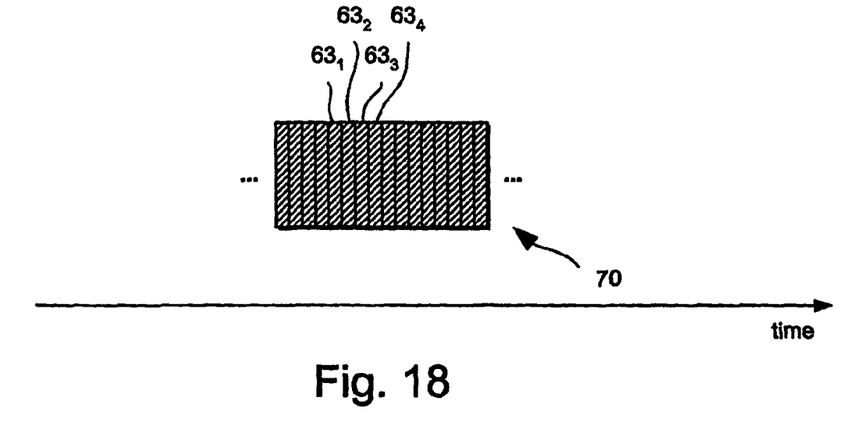
FIG. 18 illustrates transmission of non-MPE sections.

Referring to FIG. 18, EMM sections $63_1$, $63_2$, $63_3$, $63_4$ are transmitted in a continuous elementary stream 70 which can be multiplexed with other elementary streams (not shown).

In this case, EMM sections $63_1$, $63_2$, $63_3$, $63_4$ cannot be conveniently transmitted in bursts since time slicing parameters are not provided. Adding time slicing parameters to an EMM section is not a realistic solution because it requires modification of the EMM section structure which is fixed by a standard.

Without time slicing parameters, such as delta-t, a receiving device $5_1$, $5_2$ (FIG. 1) does not know when to expect the next burst. Thus, the receiver $22_1$ (FIG. 4) in the receiving device $5_1$, $5_2$ (FIG. 1) is usually always switched on, to help ensure that EMM messages are not lost.

This problem is not limited to EMM messages. Other types of data are transmitted in sections based on the MPEG-2 private section. For example, DVB-SI includes sets of tables which are carried on sections following the MPEG-2 private section structure. In particular, the network information table (NIT) is carried on network_information_sections defined by ETSI EN 300 468. It defines a signalling mechanism for locating the INT under various network configurations. The INT can be accessed via one or more linkage descriptors located in the NIT or via the IP/MAC Notification BAT. The IP/MAC Notification BAT/NIT itself may be available on one or more transport streams on the network, and located via a further level of indirection through a linkage descriptor in the NIT. This last scheme is mainly applicable for very large networks. Reference is also made to TR 101 162.

Nevertheless, it is desirable to transmit MPEG-2 private sections in bursts and/or to transmit MPEG-2 private sections in bursts in a convenient way.

Preparing and Transmitting MPEG-2 Private Sections in Bursts

Figure 19:
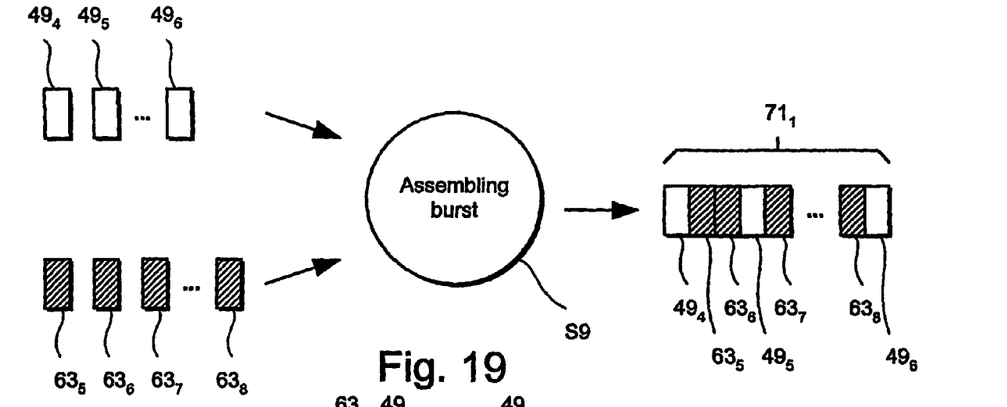
FIG. 19 illustrates assembling a burst comprising MPE sections and non-MPE sections.

Referring to FIG. 19, a process by which the MPE encapsulator 8 (FIG. 1) can generate bursts is shown.

One or more MPE or MPE-FEC sections $49_4$, $49_5$, $49_6$ are added to an elementary stream carrying other sections $63_5$, $63_6$, $63_7$, $63_8$ based on the MPEG-2 private section, which in this example are EMM sections, to produce a burst $71_1$ (step S9).

The burst $71_1$ includes at least one MPE or MPE-FEC section $49_4$, $49_5$, $49_6$ and the last section of the burst $71_1$ comprises an MPE or MPE-FEC section $49_6$.

The MPE or MPE-FEC section $49_6$ at the end of the burst $71_1$ is used to indicate the end of the burst $71_1$. This is specified using a time-slicing parameter, in particular using the frame_boundary field 58 (FIG. 10).

At least one of the one or more MPE or MPE-FEC sections $49_4$, $49_5$, $49_6$ is used to indicate the start of the next burst $71_2$. This is specified using another time-slicing parameters, namely using the delta_t field 57 (FIG. 10). If no other MPE or MPE-FEC sections $49_4$, $49_5$ are provided other than the MPE or MPE-FEC section $49_6$ at the end of the burst $71_1$ or if other MPE or MPE-FEC sections $49_4$, $49_5$ are provided but do not specify a value of delta-t, then the MPE or MPE-FEC section $49_6$ at the end of the burst $71_1$ also includes a value of delta-t $74_2$ (FIG. 21) its delta_t field 57 (FIG. 10).

Thus, not only is the end of the burst $71_1$ defined, but an indication of when to expect the next burst $71_2$ (FIG. 21) is provided.

The MPE/MPE-FEC section structure is particularly advantageous since positions of the table_id field 54, delta_t field 57 and frame_boundary field 58 are fixed. In other words, the offset between the beginning of the section and a field, such as the delta_t field 57, is the same from one MPE/MPE-FEC section to the next. Therefore, it may be easily determined whether a section is an MPE/MPE-FEC section and, if so, to extract a delta-t value and/or check the frame_boundary flag 58.

The MPE or MPE-FEC sections $49_4$, $49_5$, $49_6$ may just include header information and so the remainder of a section $49_4$, $49_5$, $49_6$ can be skipped.

Figure 20:
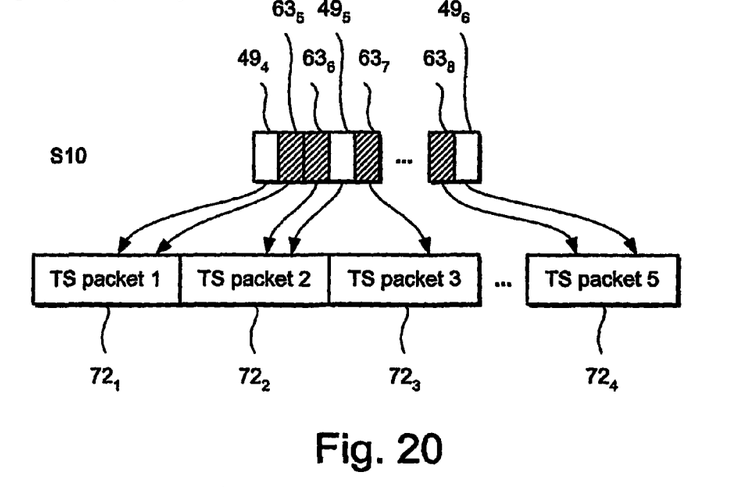
FIG. 20 illustrates encapsulation of MPE and non-MPE sections in transport stream packets

Referring to FIG. 20, the sections $49_4$, $49_5$, $49_6$, $63_5$, $63_6$, $63_7$, $63_8$ are placed in TS packets $72_1$, $72_2$, $72_3$ according to ISO/IEC 13818-1 (step S10) each having the same PID, thus identifying the elementary stream to which they belong.

Figure 21:
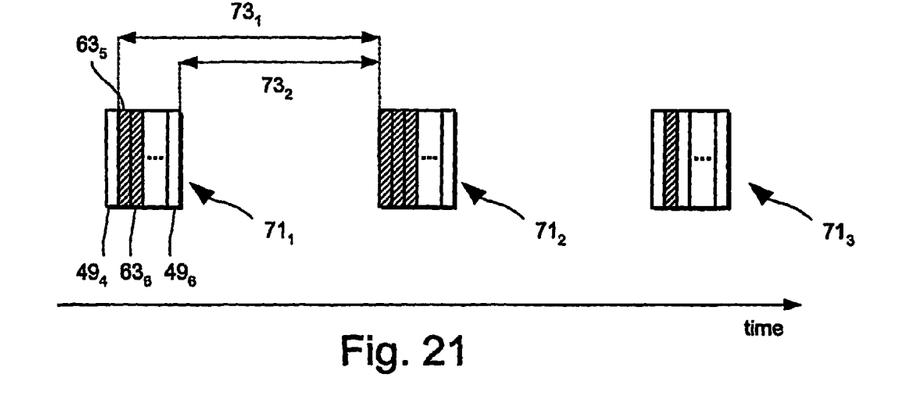
FIG. 21 illustrates a plurality of bursts including non-MPE sections.

Referring to FIG. 21, a plurality of bursts $71_1$, $71_2$, $71_3$ which comprise MPE/MPE$_\leq$FEC sections and non MPE/MPE_FEC sections are shown. Subsequent bursts $71_2$, $71_3$ are assembled in a manner similar to that described earlier. However, the number and/or the order of MPE/MPE_FEC sections and non MPE/MPE_FEC sections may differ from one burst to the next.

As explained earlier, the value of delta-t can vary from one section to another. For example, a first MPE section $49_4$ specifies a first value of delta-t $73_1$ and a second MPE section $49_6$ specified a second, different value of delta-t $73_2$.

Operation of a Receiving Device $5_1$, $5_2$

Figure 22:
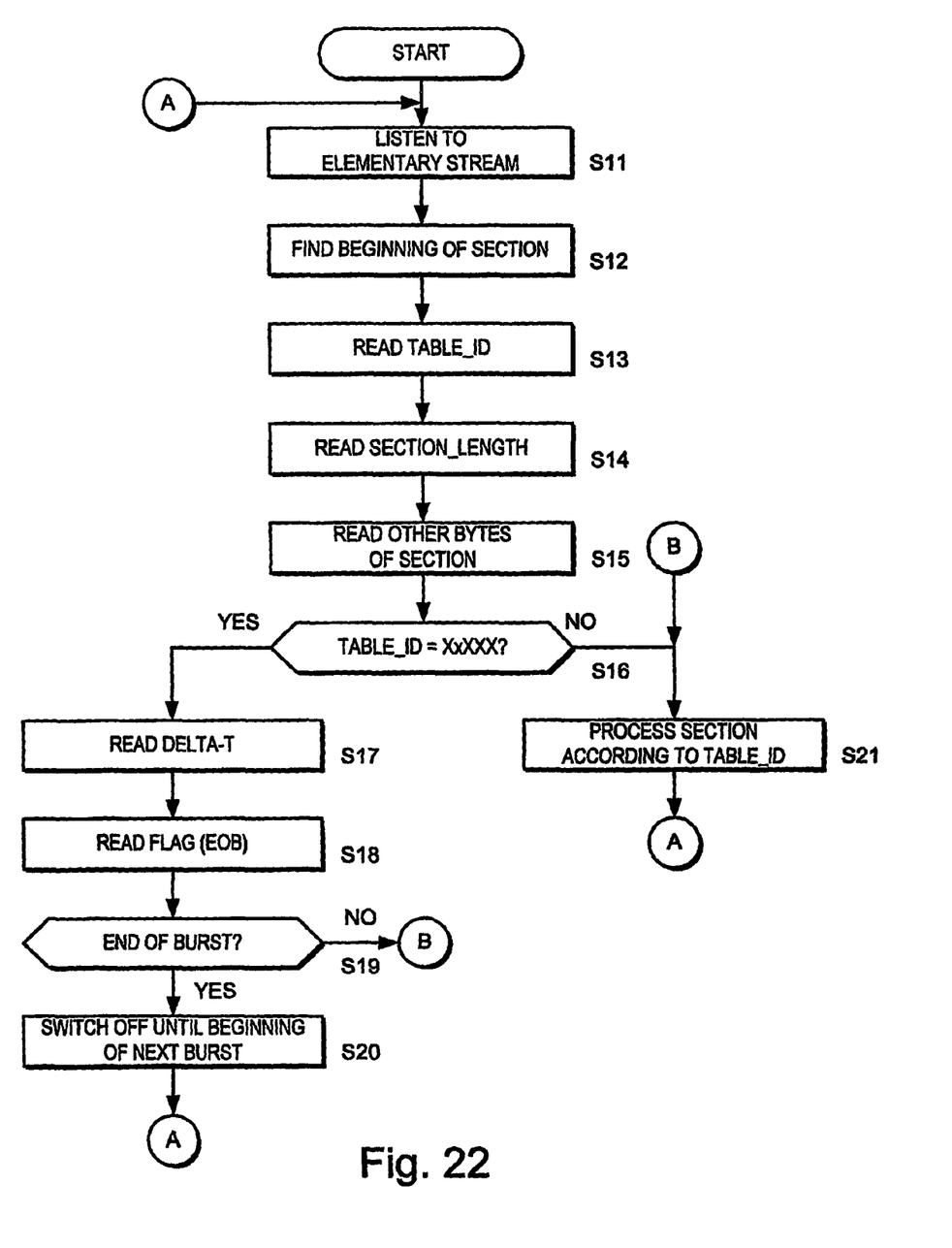
FIG. 22 is process flow diagram of a process performed by the mobile telephone handset shown in FIG. 4.

Referring to FIGS. 4 and 22, a method of operating a receiving device $5_1$, $5_2$ is shown.

The receiver $22_1$ listens to a transport stream (not shown) carrying a burst $71_1$, $71_2$, $71_3$ relating to a given elementary stream and extracts a section $49_4$, $49_5$, $49_6$, $63_5$, $63_6$, $63_7$, $63_8$ (step S11). The receiver $22_1$ locates the beginning of the section $49_4$, $49_5$, $49_6$, $63_5$, $63_6$, $63_7$, $63_8$ (step S12). The receiver $22_1$ inspects the table_id field 54, 67 (step S13) and the section_length field 55, 68 (step S14). The receiver $22_1$ reads the remaining bytes of the section $49_4$, $49_5$, $49_6$, $63_5$, $63_6$, $63_7$, $63_8$ (step S15).

The receiver $22_1$ inspects the table_id field 54, 67 so as to determine whether the section $49_4$, $49_5$, $49_6$, $63_5$, $63_6$, $63_7$, $63_8$ is an MPE/MPE-FEC section $49_4$, $49_5$, $49_6$ step S15). For example, it may check whether the value held in the table_id field 54, 67 is 0x74 (hexadecimal).

If the receiver $22_1$ identifies the section $49_4$, $49_5$, $49_6$, $63_5$, $63_6$, $63_7$, $63_8$ as an MPE/MPE-FEC section $49_4$, $49_5$, $49_6$, it reads the delta_t field 57 and stores the value of delta-t (step S17).

The receiver $22_1$ also reads the frame_boundary field 58 (step S18) and inspects the flag so as to determine whether the MPE/MPE-FEC section $49_4$, $49_5$, $49_6$ is the last in the burst $71_1$ (step S19).

If the receiver $22_1$ identifies the MPE/MPE-FEC section $49_4$, $49_5$, $49_6$ is the last in the burst $71_1$, then it determines an "off-time" from the end of the current burst $71_1$ to the beginning of the next burst $71_2$ using the stored value of delta-t $73_2$ (step S20).

Otherwise, the receiver $22_1$ processes the section (step S21) and continues to receive the next section in the burst $71_1$ (step S1).

The process is performed for each burst $71_1$, $71_2$, $71_3$.

In this way, the receiver $22_1$ can switch on to receive a burst $71_1$, extract delta-t information to identify the start of the next burst $71_2$ and extract frame boundary information to identify the end of the current burst and so switch off until the next burst $71_2$ and so continue.

It will be appreciated that many modifications may be made to the embodiment described above. For example, although MPE/MPE-FEC sections are described, other types of section which include time-slicing parameters may be used instead of MPE/MPE-FEC sections. More than two types of section may be included in a burst.

The invention claimed is:

1. A method comprising:
   receiving data;
   providing a first data structure without any time-slicing parameters for describing bursts to be transmitted in a communications network based on the data;
   providing a second data structure with a set of time-slicing parameters, wherein the first and second data structures are protocol data units which are hierarchically substantially equal;
   forming a burst including said first and second data structures, wherein forming the burst comprises adding the second data structure to a stream comprising the first data structure; and
   transmitting the burst to the communications network, wherein the time-slicing parameters include an indication of time to a next burst, and between the burst and the next burst no data structures are transmitted in the stream.

2. The method according to claim 1, wherein forming said burst comprises:
   arranging said second data structure at an end of said burst.

3. The method according to claim 1, including:
   providing, in said second data structure, data indicating end of said burst.

4. The method according to claim 3, wherein providing said data indicating the end of said burst comprises:
   locating said data at a first predetermined position within said second data structure.

5. The method according to claim 1, including:
   providing, in said second data structure, data relating to a subsequent burst.

6. The method according to claim 1, including:
   providing, in said second data structure, data relating to an adjacent, subsequent burst.

7. The method according to claim 5, wherein providing data relating to said subsequent burst or said subsequent adjacent burst comprises:
   specifying a time until a beginning of a subsequent burst.

8. The method according to claim 5, wherein providing data relating to said subsequent burst or said subsequent adjacent burst comprises:
   specifying a beginning of a subsequent burst relative to a position of said second structure within said burst.

9. The method according to claim 2, wherein providing said data relating to said subsequent burst or said subsequent adjacent burst comprises:
   locating said data at a second predetermined position within said second data structure.

10. The method according to claim 9, comprising:
    providing a third data structure with a set of time-slicing parameters; and forming a burst including said first, second and third data structures.

11. The method according to claim 10, including:
    providing, in said third data structure, data relating to a subsequent burst.

12. The method according to claim 10, including:
    providing, in said third data structure, data relating to an adjacent, subsequent burst.

13. The method according to claim 11, wherein providing data relating to said subsequent burst or said subsequent adjacent burst comprises:
    specifying a time until a beginning of a subsequent burst.

14. The method according to claim 11, wherein providing data relating to said subsequent burst or said subsequent adjacent burst comprises:
    specifying a beginning of a subsequent burst relative to a position of said third structure within said burst.

15. The method according to claim 11, wherein providing said data relating to said subsequent burst or said subsequent adjacent burst comprises:
    locating said data at a third predetermined position within said third data structure; wherein said third predetermined position within said third data structure corresponds to said second predetermined position-within said second data structure.

16. The method according to claim 1, comprising:
including, in said first data structure, a first identifier for identifying said first data structure as being of a first type and
including, in said second data structure, a second identifier for identifying said second data structure as being, of a second, different type.

17. The method according to claim 16, wherein including said first and second identifiers comprises:
providing said first identifier at a fourth predetermined position within said first data structure; and
providing said second identifier at a fifth predetermined position within said second data structure;
wherein said fourth predetermined position within said first data structure corresponds to said fifth predetermined position within said second data structure.

18. The method according to claim 1, wherein providing said second data structure comprises: providing a multiprotocol encapsulation section.

19. The method according to claim 18, wherein providing said second data structure comprises:
formatting data using Digital Storage Media Command and Control section format.

20. The method according to claim 18, comprising:
locating said set of time-slicing parameters within at least part of a data region formed by at least one media access control address field.

21. The method according to claim 18, comprising:
locating said set of time-slicing parameters within at least part of a data region formed by four media access control address fields.

22. The method according to claim 1, wherein providing said first data structure comprises: providing a motion picture experts group type 2 private section.

23. A method of operating a network element in a communications network, the method comprising:
forming a burst by adding a first data structure with a set of time-slicing parameters for describing bursts to a stream comprising a second data structure without any time-slicing parameters, wherein the first and second data structures are protocol data units which are hierarchically substantially equal; and
transmitting the burst to the communications network, wherein the time-slicing parameters include an indication of time to a next burst, and between the burst and the next burst no data structures are transmitted in the stream.

24. A method of operating a receiving device in a communications network, the method comprising:
receiving a burst including a first data structure with a set of time-slicing parameters for describing bursts and a second data structure without any timeslicing parameters, wherein the first and second data structures are protocol data units which are hierarchically substantially equal;
identifying said first data structure; and
extracting at least one time slicing parameter from said first data structure, wherein the at least one time-slicing parameter includes an indication of time to a next burst, and between the burst and the next burst no data structures are received in the stream.

25. The method according to claim 24, wherein identifying said first data structure comprises:
inspecting a first predetermine field in each of said first and second data structures.

26. The method according to claim 24, wherein extracting said at least one time slicing parameter from said first data structure comprises:
inspecting a second predetermined field in said first structure; and
reading from said second predetermined field, data relating to a subsequent burst.

27. The method according to claim 26, further comprising:
storing said data relating to a subsequent burst.

28. The method according to claim 24, further comprising:
inspecting a third predetermined field in said first structure; and
reading from said third predetermined field, data indicating end of said burst.

29. A memory embedded with computer program instructions for causing a data processing apparatus to perform the method of claim 1 when said computer program instructions are executed by said data processing apparatus.

30. An apparatus, comprising:
a receiver configured to receive data;
an encapsulator configured to form a burst by adding a first data structure with a set of time-slicing parameters for describing bursts of data to a stream comprising a second data structure without any time-slicing parameters, wherein the second data structure is based on the data, and the first and second data structures are protocol data units which are hierarchically substantially equal; and
a transmitter configured to transmit the burst to a communications network, wherein the time-slicing parameters include an indication of time to a next burst, and between the burst and the next burst no data structures are transmitted in the stream.

31. The apparatus according to claim 30, wherein said first data structure comprises:
a multiprotocol encapsulation section.

32. The apparatus according to claim 30, wherein said first data structure comprises:
a multiprotocol encapsulation-forward error correction section.

33. The apparatus according to claim 30, wherein said second data structure comprises:
a motion picture experts group type 2 private section.

34. A network element comprising an apparatus according to claim 30.

35. A handset comprising:
a receiver; and
a processor;
said handset configured to receive a burst including a first data structure with a set of time-slicing parameters for describing bursts and a second data structure without any time-slicing parameters, wherein the first and second data structures are protocol data units which are hierarchically substantially equal, to identify said first data structure; and to extract at least one time slicing parameter from said first data structure, wherein the at least one time-slicing parameter includes an indication of time to a next burst, and between the burst and the next burst no data structures are received in the stream.

36. An apparatus comprising:
means for receiving data;
means for providing a first data structure without any time-slicing parameters for describing bursts to be transmitted in a communications network based on the data;
means for providing a second data structure with a set of time-slicing parameters, wherein the first and second data structures are protocol data units which are hierarchically substantially equal;

means for forming a burst including said first and second data structures, wherein forming the burst comprises adding the second data structure to a stream comprising the first data structure; and means for transmitting the burst to the communications network, wherein the time-slicing parameters include an indication of time to a next burst, and between the burst and the next burst no data structures are transmitted in the stream.

37. A memory embedded with computer program instructions for causing a data processing apparatus to perform the method of claim 24 when said computer program instructions are executed by said data processing apparatus.

* * * * *